United States Patent
Harano

(10) Patent No.: US 7,072,623 B2
(45) Date of Patent: Jul. 4, 2006

(54) RADIO TERMINAL DEVICE

(75) Inventor: Nobuya Harano, Kakegawa (JP)

(73) Assignee: NEC Corporation, Tokyo (JP)

( * ) Notice: Subject to any disclaimer, the term of this patent is extended or adjusted under 35 U.S.C. 154(b) by 595 days.

(21) Appl. No.: 10/289,352

(22) Filed: Nov. 7, 2002

(65) Prior Publication Data

US 2003/0087612 A1 May 8, 2003

(30) Foreign Application Priority Data

Nov. 7, 2001 (JP) ............................. 2001-341841

(51) Int. Cl.
*H04B 1/38* (2006.01)

(52) U.S. Cl. ............ 455/90.3; 455/117; 455/301; 455/575.5; 455/575.8; 361/814

(58) Field of Classification Search ........... 455/90.3, 455/117, 128, 300, 301, 575.1, 575.3, 575.5, 455/575.8; 361/814, 816
See application file for complete search history.

(56) References Cited

U.S. PATENT DOCUMENTS 5,513,078 A * 4/1996 Komrska et al. ......... 361/816
5,731,963 A 3/1998 Heiss et al.
6,327,485 B1 * 12/2001 Waldron ................. 455/575.3
6,490,438 B1 12/2002 Wu

FOREIGN PATENT DOCUMENTS

| CN | 1264237 A | 8/2001 |
|---|---|---|
| EP | 0522538 | 1/1993 |
| EP | 1220458 | 7/2002 |
| GB | 2372899 | 9/2002 |
| JP | 7-106999 | 4/1995 |
| JP | 3035683 | 1/1997 |

OTHER PUBLICATIONS

Authors: Xiang-yu Guo, Zi-dong Zhang, Rui Ma, Xiao-guang Zhang, Song Guan, Rui Xia, Chum Yao and Tian-fu Nin "The technology of electromagnetic shield of the electronic devices", Photoelectronic warefare and Radio interference, Internet: www.cnki.net, Feb. 2001, pp. 38-47.

* cited by examiner

Primary Examiner—Lee Nguyen
(74) Attorney, Agent, or Firm—Young & Thompson

(57) ABSTRACT

An enclosure part in the vicinity of a receiver part or an enclosure part to which a user brings its head close during a call is formed out of a nonconductive material of resin or the like, and an enclosure part being lower than the enclosure part of the nonconductive material has an electric conductor.

28 Claims, 7 Drawing Sheets

RADIO TERMINAL DEVICE

BACKGROUND OF THE INVENTION

1. Field of the Invention

The present invention relates to a radio terminal device, and more particularly to a radio terminal device having an improved antenna characteristic.

2. Description of the Related Prior Art

In recent years, a radio terminal device such as a cellular phone and the like has a high-performance communication characteristic and is small-sized and thin-sized.

A user makes its head close to a radio terminal device when using the device. The human head has a characteristic of having an influence on a radio wave. Due to this, when a user uses a radio terminal device, the head of a user has an influence on the communication characteristic of a radio terminal device. The communication characteristic of a small-sized and thin-sized radio terminal device is greatly influenced by a human head. Therefore, design of a radio terminal device, particularly design of an antenna must be performed so as to reduce the influence by the human head. Japanese Utility Model Publication No. 3,035,683 has disclosed a cellular phone being provided with an electrically conductive surface coated with a conductive material all over the internal surface of its enclosure. This cellular telephone prevents its transmission and reception characteristics from being subject to electrically influence from the outside by shielding the whole enclosure. However, since the antenna of this cellular phone is arranged outside the enclosure, it is liable to be subject to various influences.

SUMMARY OF THE INVENTION

A radio terminal device of a first concrete example of the present invention has an enclosure having a receiver part, and this enclosure is formed out of a nonconductive material in the vicinity of the receiver part and has an electric conductor in the remaining part other than the receiver part.

A radio terminal device of a second concrete example of the present invention has an enclosure having a receiver part, and this enclosure is provided with a first enclosure having the receiver part and a second enclosure being connected to the first enclosure through a movable portion, and the vicinity of the receiver part of the first enclosure is formed out of a nonconductive material and the enclosure part other than the vicinity of the receiver part has an electric conductor.

And in a radio terminal device of another concrete example, the whole enclosure of it is formed out of a nonconductive material and can have an electric conductor on the internal surface of the enclosure part other than the vicinity of the receiver part.

BRIEF DESCRIPTION OF THE DRAWINGS

The objects, features and advantages of the present invention will become apparent from the following detailed description when taken with the accompanying drawings in which.

DETAILED DESCRIPTION OF THE PREFERRED EMBODIMENTS

Figure 1:
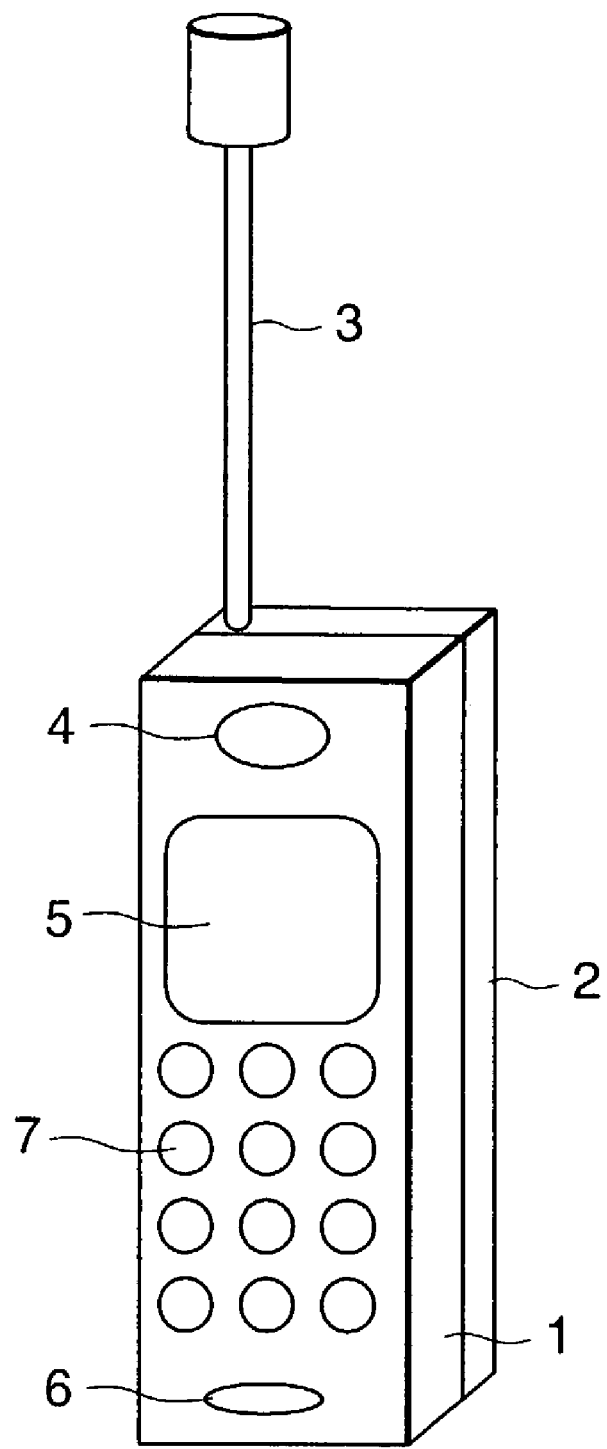
FIG. 1 is a perspective view showing a first concrete example of a radio terminal device of the present invention.

FIG. 1 is a perspective view showing a first concrete example of a radio terminal device of the present invention. The enclosure of the radio terminal device shown in FIG. 1 consists of one container.

In FIG. 1, the enclosure of the radio terminal device comprises an enclosure front portion 1 having a device circuit board (not illustrated) built in it and an enclosure rear portion 2 having a whip antenna 3 built in the upper part of it.

The enclosure front portion 1 is a part in which a user of the radio terminal device faces the said terminal device. The enclosure front portion 1 is provided with a receiver part 4, a transmitter part 6, a key part 7 and a display part 5 such as an LCD, a plasma display or the like on the external surface of the enclosure front portion 1.

Figure 2:
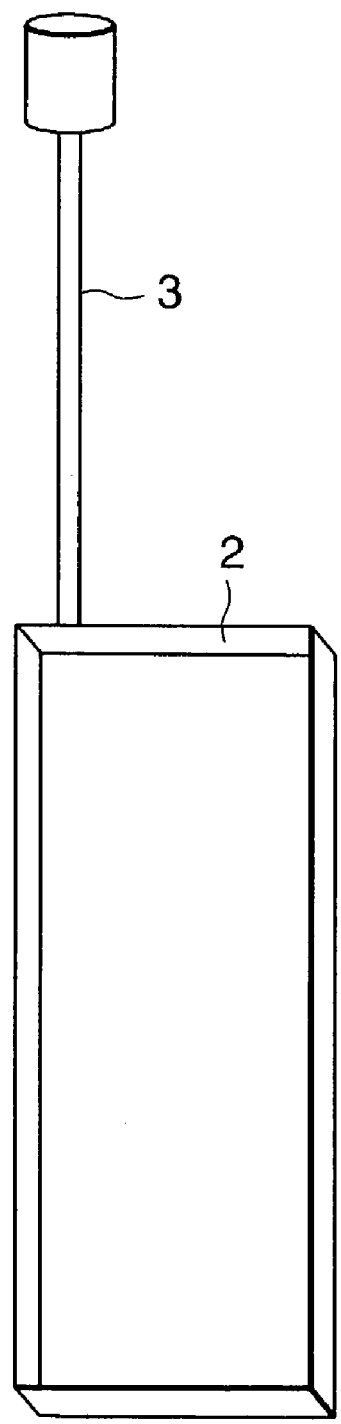
FIG. 2 is a perspective view showing a concrete example of the rear part of an enclosure of the radio terminal device.

FIG. 2 shows an example of the inside of the enclosure rear portion 2 and the whip antenna 3. The enclosure rear portion 2 is formed out of a nonconductive material of resin or the like. In this example, the enclosure rear portion 2 comprises no electric conductor. The enclosure rear portion 2 has the whip antenna attached to it. The whip antenna 3 is arranged in the enclosure rear portion 2 being more distant from a human body having an influence on a radio wave to be transmitted or received during a call.

Figure 3:
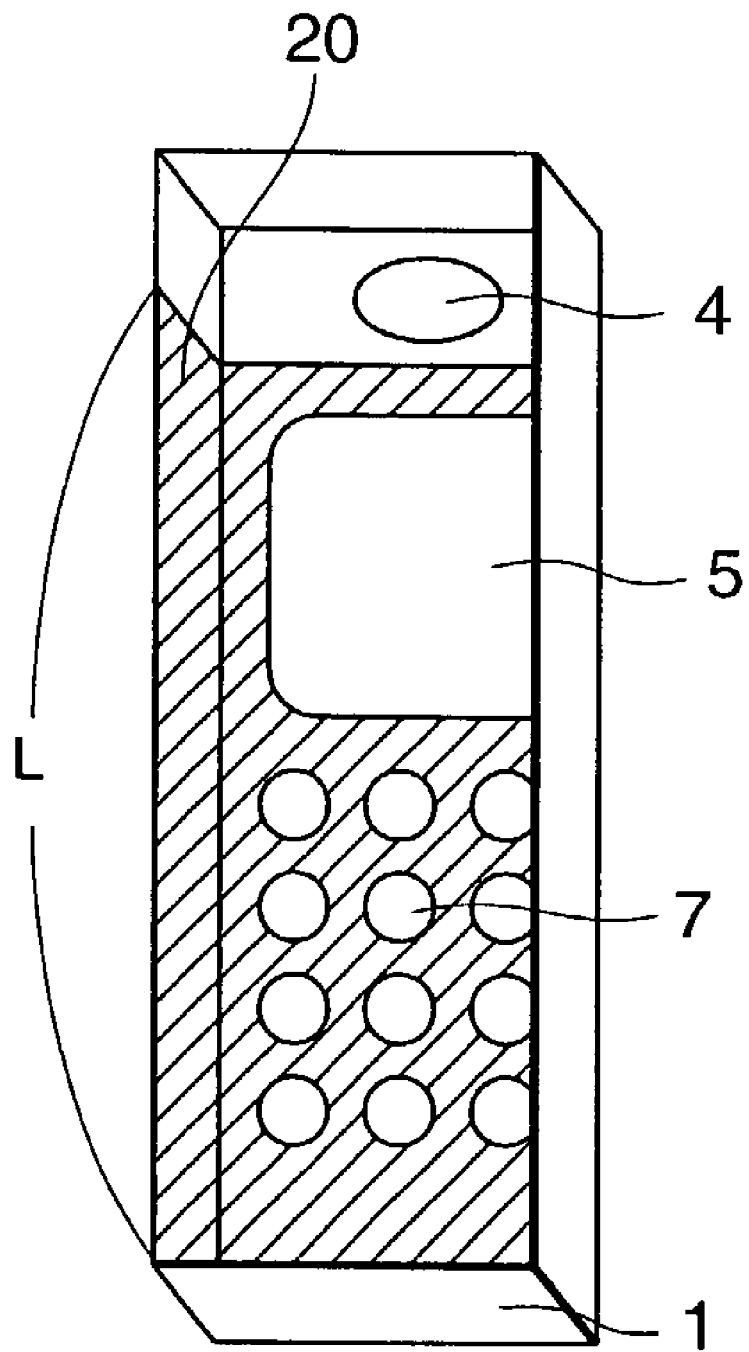
FIG. 3 is a perspective view showing a concrete example of the front part of an enclosure of the radio terminal device.

FIG. 3 shows an example of the inside of the enclosure front portion 1. The enclosure front portion 1 is formed out of a nonconductive material and is provided with a conductive thin film 20 on the internal surface of the enclosure front portion 1 other than the vicinity of the receiver part 4. In this example, the internal surface of the enclosure front portion 1 other than the vicinity of the receiver part 4 consists of an area where the display part 5, the key part 7 and the transmitter part 6 are arranged and side face areas of the enclosure front portion 1. An antenna feeding point (not illustrated) is arranged in the vicinity of the receiver part 4. The conductive thin film 20 arranged on the internal surface of the enclosure front portion 1 is not directly connected to the whip antenna 3. When a high-frequency current flows on the whip antenna 3, an image current flows on this conductive thin film 20 due to this high-frequency current.

This conductive thin film 20 has a length of L in the longitudinal direction of the enclosure front portion 1. This length (L) is properly determined in consideration of the transmission and reception characteristics of the radio terminal device.

Figure 4:
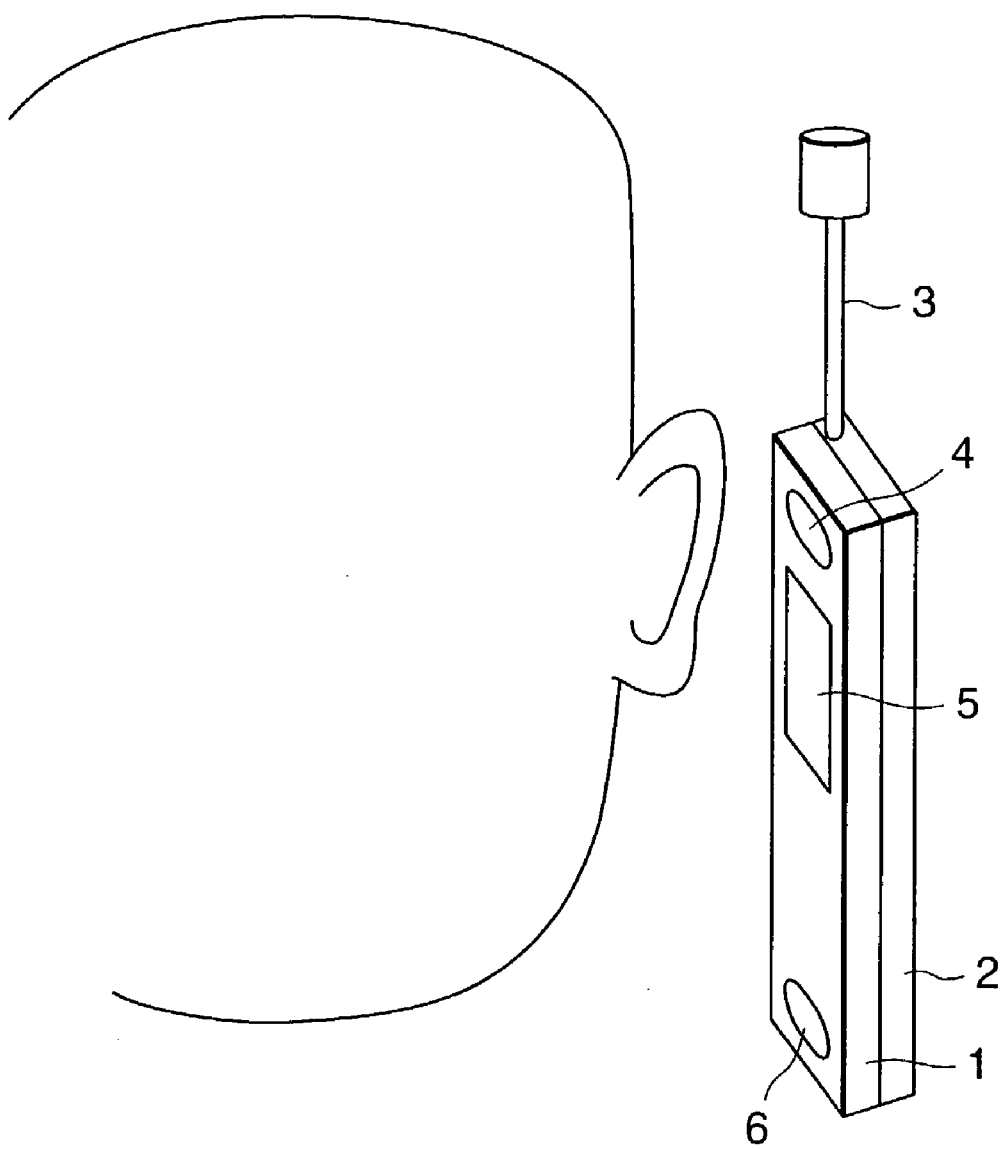
FIG. 4 is a figure showing an example in which a user uses the radio terminal device.

Since the conductive thin film 20 is not arranged in the vicinity of the receiver part 4, no image current flows in the vicinity of the receiver part 4. Thanks to this, as shown in FIG. 4, even if a user brings its head close to the vicinity of the receiver part 4 or presses an ear of it against the receiver part 4 for a call, this human head has no influence on an image current in the conductive thin film 20.

Figure 5:
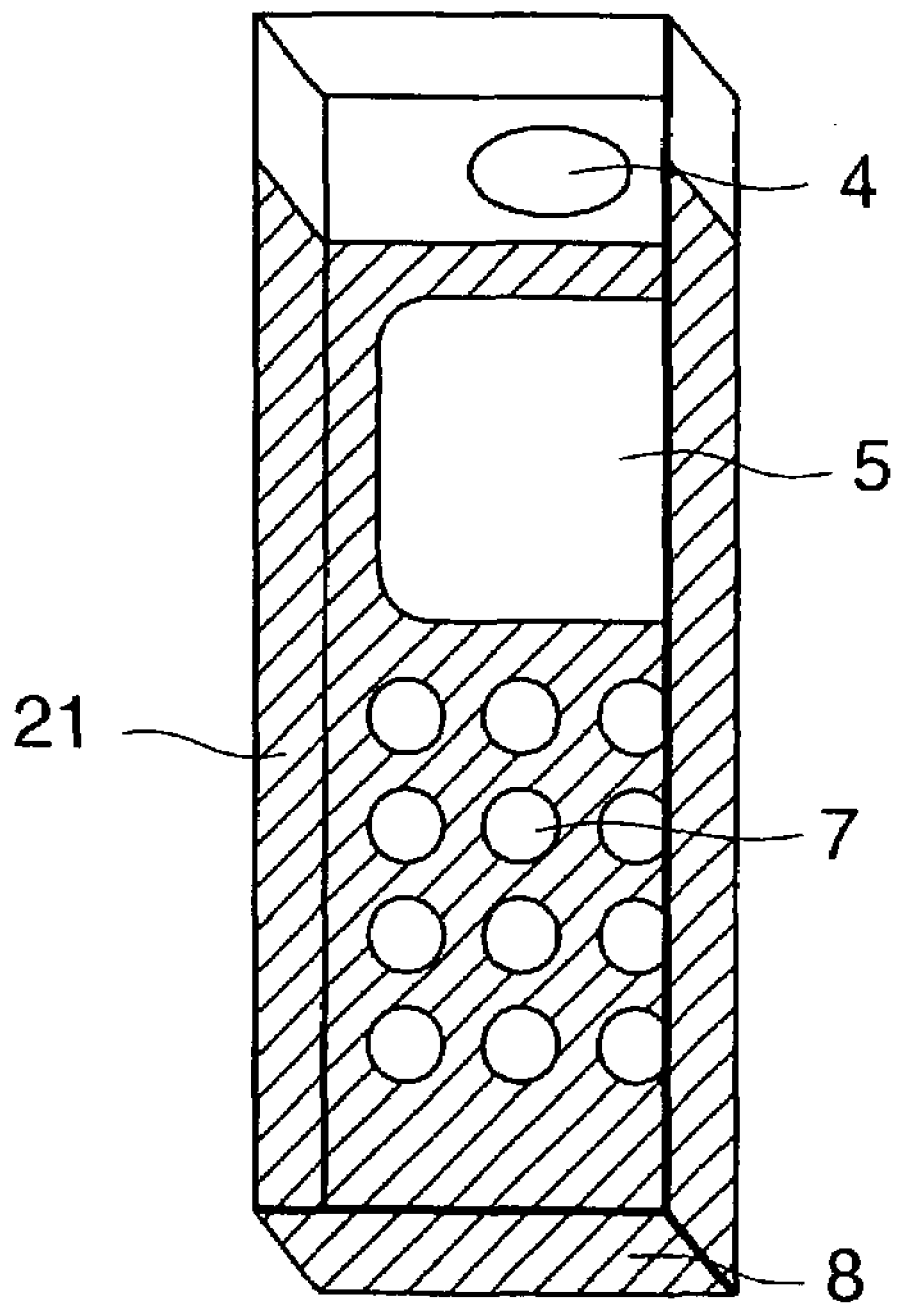
FIG. 5 is a perspective view showing another concrete example of the front part of an enclosure of a radio terminal device.

Thanks to this, the antenna characteristic of the radio terminal device is not deteriorated. FIG. 5 is a perspective view showing another concrete example of the enclosure front portion 1.

The enclosure front portion 8 uses a nonconductive material in the vicinity of the receiver part 4 and uses a conductive material 21 of metal or the like in the remaining part other than the vicinity of the receiver part 4. In this case, neither a metal-plating film nor a conductive coating is necessary. This enclosure front portion 1 displays the same effect as the enclosure front portion 8 of FIG. 3.

Figure 6:
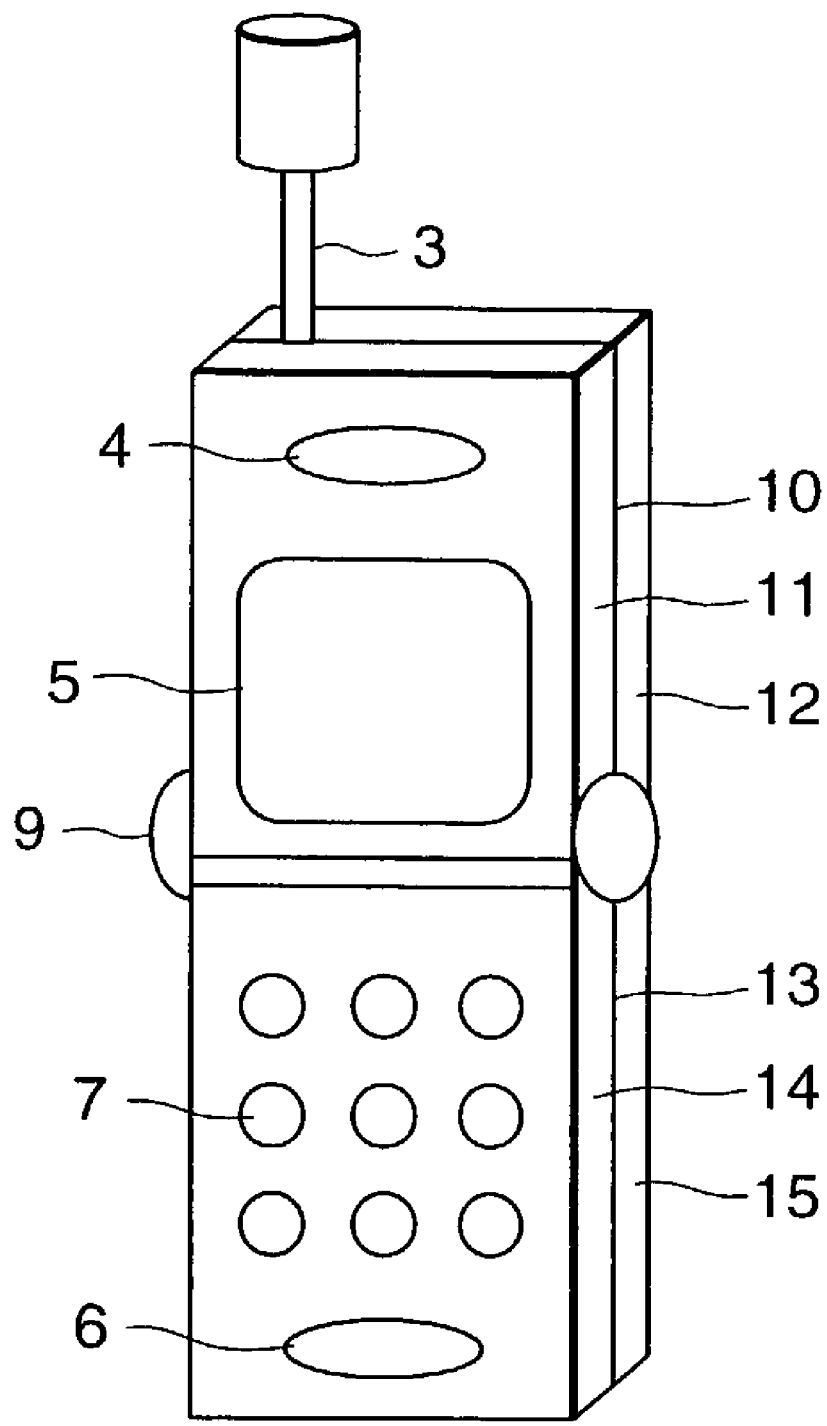
FIG. 6 is a perspective view showing a second concrete example of a radio terminal device of the present invention.

FIG. 6 is a perspective view showing a second concrete example of a radio terminal device of the present invention.

This radio terminal device comprises a first enclosure 10 being provided with a receiver part 4 and a second enclosure 13 being connected to the first enclosure 10 through a movable portion 9 of a hinge or the like. The first enclosure 10 comprises an enclosure front portion 11 and an enclosure rear portion 12, and the second enclosure 13 comprises an enclosure front portion 14 and an enclosure rear portion 15.

In the radio terminal device of FIG. 6, device circuit boards (not illustrated) are built in the first enclosure front portion 11 and the second enclosure front portion 14, and a whip antenna 3 is attached to the first enclosure rear portion 12. The first enclosure front portion 11 is provided with a receiver part 4 and a display part 5. The second enclosure front portion 14 is provided with a transmitter part 6 and a key part 7.

This radio terminal device is folded at the movable portion 9 (hinge for example).

Figure 7:
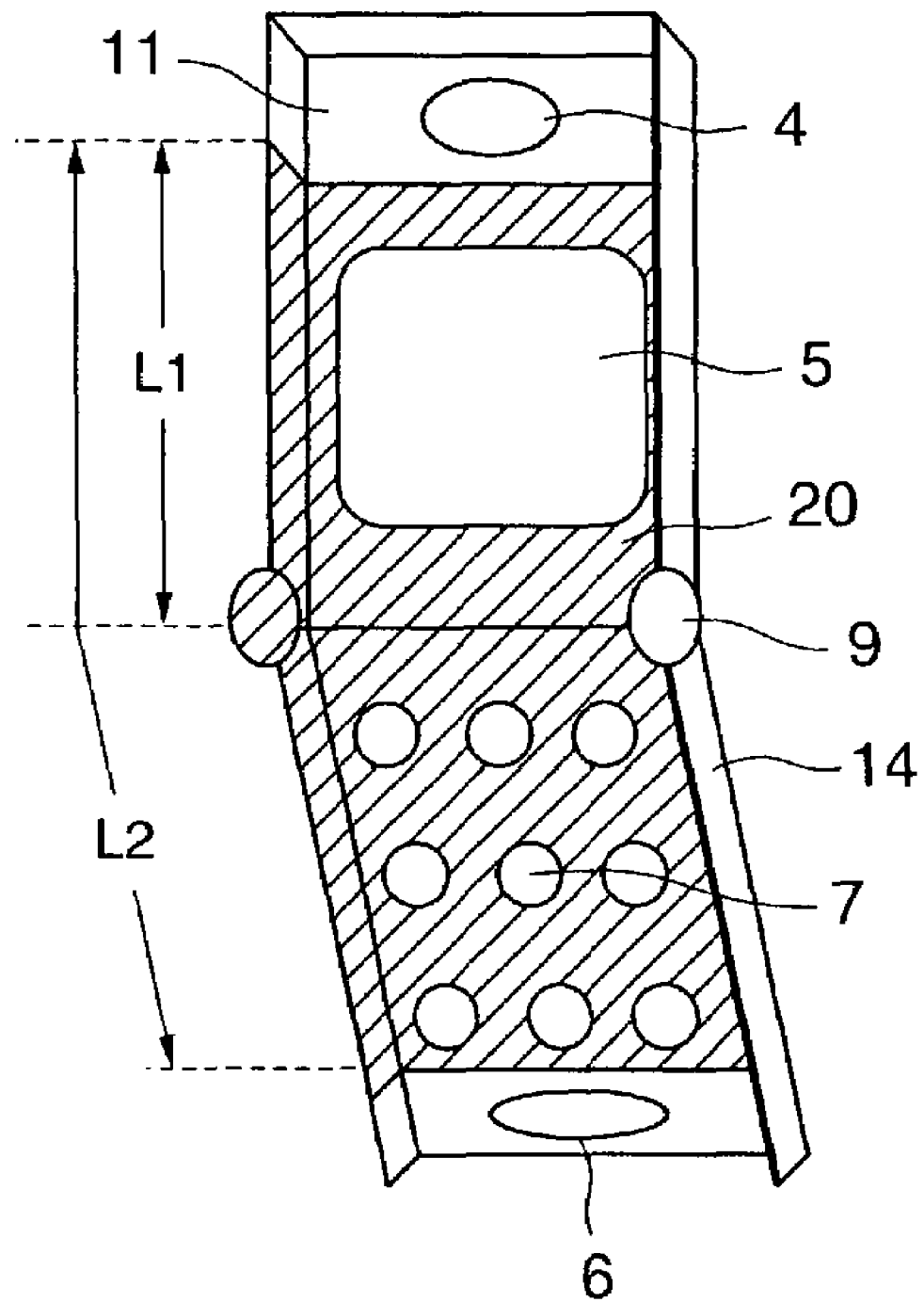
FIG. 7 is a perspective view showing a concrete example of the front part of an enclosure of the radio terminal device.

FIG. 7 shows an example of the respective insides of the enclosure front portion 11 of the first enclosure 10 and the enclosure front portion 14 of the second enclosure 13. The first enclosure front portion 11 and the second enclosure front portion 14 are connected to each other so as to be capable of being folded by the movable portion 9. The first enclosure rear portion 12 and the second enclosure rear portion 15 which are not illustrated are also connected to each other so as to be capable of being folded by the movable portion 9 in the same way.

In FIG. 7, the first enclosure front portion 11 and the second enclosure front portion 14 are formed out of a nonconductive material and have no electric conductor in the vicinity of the receiver part 4. A conductive thin film 20 is arranged on the internal surface of the first enclosure front portion 11 other than the vicinity of the receiver part 4 and the internal surface of the second enclosure front portion 14. Concretely, the conductive thin film 20 is formed on an area where a display part 5, a key part 7 and a transmitter part 6 are arranged.

The conductive thin film 20 shown in FIG. 7 is not directly connected to a whip antenna 3. When a high-frequency current flows on the whip antenna 3, an image current flows on this conductive thin film 20 due to this high-frequency current.

The conductive thin film 20 arranged on the first enclosure front portion 11 and the conductive thin film 20 arranged on the second enclosure front portion 14 are electrically connected to each other.

In FIG. 7, the conductive thin film 20 arranged on the internal surface of the first enclosure front portion 11 has a length of L1 in the longitudinal direction of the first enclosure front portion 11. The conductive thin film 20 having a total length of L2 may be arranged on the internal surface of the first enclosure front portion 11 and the internal surface of the second enclosure front portion 14. These lengths (L1 and L2) are properly determined in consideration of the transmission and reception characteristics of the radio terminal device.

And in FIG. 7, the second enclosure front portion 14 may be a conductive enclosure of metal or the like.

In the second concrete example, since the vicinity of the receiver part 4 of the first enclosure front portion 11 is formed out of a nonconductive material and has no conductive material arranged on it and a conductive thin film 20 is arranged on the remaining enclosure part other than the vicinity of the receiver part 4 of the first enclosure front portion 11, the same effect as the first concrete example can be obtained.

The conductive thin film 20 can be formed by such a method as plating of metal, application of conductive paint, evaporation of metal, adhesion of a metal film or the like. These plural methods can be combined together. And it may be also acceptable to embed a metal rod or metal plate inside a nonconductive material in an area in which a conductive thin film 20 is to be formed instead of forming the conductive thin film 20.

The present invention is not limited to the concrete examples described above. For example, although in FIG. 1 and FIG. 6 the present invention shows examples of a cellular phone, it is not limited to them but may be another radio terminal device such as a cordless telephone, a mobile phone, a pager or the like.

And in FIG. 1, a device circuit board may be built in the enclosure rear portion 2 rather than the enclosure front portion 1.

Further in FIG. 6, device circuit boards may be built in the first and second enclosure rear portions rather than the first and second enclosure front portions. The width of an electric conductor 20 may be optional. The electric conductor 20 may be formed in the enclosure rear portion. And the electric conductors 20 may be formed in both of the enclosure front portion and enclosure rear portion.

As described above, a radio terminal device of the present invention has an electric conductor for securing its antenna characteristic in the remaining part other than the enclosure part which the head of a user comes close to. Thanks to this, the head of a user does not deteriorates the antenna characteristic.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A radio terminal device having an enclosure provided with a receiver part, wherein said enclosure is formed out of a nonconductive material in the vicinity of its receiver part and has an electric conductor forming part of said enclosure in the remaining part of said enclosure other than said vicinity of the receiver part, and said electric conductor has a predetermined length in the longitudinal direction of said enclosure, the length based on desired transmission and reception characteristics of the radio terminal device.

2. A radio terminal device according to claim 1, wherein; a user of said device brings an ear of said user close to said receiver part during a call.

3. A radio terminal device according to claim 1, wherein; said receiver part is arranged in the vicinity of an end part of said enclosure.

4. A radio terminal device according to claim 1, wherein; the whole of said enclosure is formed out of a nonconductive material, and said enclosure has said electric conductor on the surface of the remaining part other than the vicinity of the receiver part.

5. A radio terminal device according to claim 4, wherein; said electric conductor is formed on the internal surface of the remaining part other than the vicinity of the receiver part.

6. A radio terminal device according to claim 5, wherein; an area in which said electric conductor is formed is a part of the inside of the enclosure.

7. A radio terminal device according to claim 1, wherein; said electric conductor is embedded inside said nonconductive material in the remaining part other than the vicinity of the receiver part of said enclosure.

8. A radio terminal device according to claim 1, wherein; said electric conductor is one or more selected from among a metal plating film, a conductive coating film, a conductive deposition film, and a conductive film adhered by an adhesive agent.

9. A radio terminal device according to claim 1, wherein; the remaining part other than said vicinity of the receiver part is formed out of a conductive material, said electric conductor comprising said conductive material.

10. A radio terminal device according to claim 1, wherein; said enclosure is a container.

11. A radio terminal device according to claim 1, wherein, said electric conductor is formed on the internal surface of a front portion of said enclosure.

12. A radio terminal device according to claim 1, wherein, said nonconductive material is arranged between said electric conductor and an antenna of the radio terminal device.

13. A radio terminal device according to claim 12, wherein the radio terminal device is configured so that, in operation of the radio terminal device, a high-frequency current flows on the antenna, an image current flows on the electric conductor due to the high-frequency current flow on the antenna, and no image current flows in the vicinity of the receiver part.

14. A radio terminal device according to claim 1, wherein the radio terminal device is configured so that, in operation of the radio terminal device, a high-frequency current flows on an antenna of the radio terminal device, an image current flows on the electric conductor due to the high-frequency current flow on the antenna, and no image current flows in the vicinity of the receiver part.

15. A radio terminal device having an enclosure provided with a receiver part, said enclosure comprising:
a first enclosure having said receiver part; and
a second enclosure being connected to said first enclosure through a movable portion, wherein;
the vicinity of the receiver part of said first enclosure is formed out of a nonconductive material, and
a remaining enclosure part other than said vicinity of the receiver part has an electric conductor forming part of said enclosure, and
said electric conductor has a first predetermined total length in the longitudinal direction of said radio terminal device, the first total length based on the transmission and reception characteristics of the radio terminal device.

16. A radio terminal device according to claim 15, wherein;
said electric conductor comprises electric conductors,
a remaining part of said first enclosure other than said vicinity of the receiver part and said second enclosure each have said electric conductors,
said electric conductors are electrically connected to each other, and
said electric conductors have a second predetermined total length in the longitudinal direction of said radio terminal device, the second predetermined total length based on the transmission and reception characteristics of the radio terminal device.

17. A radio terminal device according to claim 16, wherein,
said electric conductors are formed on the internal surfaces of a front portion of said first and said second enclosures.

18. A radio terminal device according to claim 15, wherein;
only said first enclosure comprises said electric conductor.

19. A radio terminal device according to claim 15, wherein;
only said second enclosure comprises said electric conductor.

20. A radio terminal device according to claim 15, wherein;
said second enclosure is formed out of said electric conductor.

21. A radio terminal device according to claim 15, wherein;
said electric conductor is one or more selected from among a metal plating film, a conductive coating film, a conductive deposition film, and a conductive film adhered by an adhesive agent.

22. A radio terminal device according to claim 15, wherein;
said first enclosure and said second enclosure are formed out of a nonconductive material, and
said electric conductor is arranged on the surface of the remaining enclosure part other than said vicinity of the receiver part.

23. A radio terminal device according to claim 22, wherein;
said electric conductor is arranged on the internal surface of said remaining enclosure part.

24. A radio terminal device according to claim 23, wherein;
an area in which said electric conductor is formed is a part of the inside of the remaining enclosure part.

25. A radio terminal device according to claim 15, wherein;
said electric conductor is embedded inside said nonconductive material.

26. A radio terminal device according to claim 15, wherein;
the remaining enclosure part other than said vicinity of the receiver part is formed out of a conductive material, said electric conductor comprising the conductive material.

27. A radio terminal device according to claim 15, wherein,
said electric conductor is formed on the internal surface of a front portion of said first enclosure.

28. A radio terminal device according to claim 15, wherein,
said nonconductive material is arranged between said electric conductor and an antenna of the radio terminal device.

* * * * *